US012001319B2

(12) United States Patent
Gao et al.

(10) Patent No.: US 12,001,319 B2
(45) Date of Patent: Jun. 4, 2024

(54) DEVICE DEBUGGING CONNECTION CONTROL AND MAINTENANCE

(71) Applicant: MICRO FOCUS LLC, Santa Clara, CA (US)

(72) Inventors: Wen-Bin Gao, Shanghai (CN); Lingli Wu, Shanghai (CN); Ning Xia, Shanghai (CN)

(73) Assignee: Micro Focus LLC, Santa Clara, CA (US)

(*) Notice: Subject to any disclaimer, the term of this patent is extended or adjusted under 35 U.S.C. 154(b) by 173 days.

(21) Appl. No.: 17/621,981

(22) PCT Filed: Jul. 10, 2019

(86) PCT No.: PCT/CN2019/095398
§ 371 (c)(1),
(2) Date: Dec. 22, 2021

(87) PCT Pub. No.: WO2021/003694
PCT Pub. Date: Jan. 14, 2021

(65) Prior Publication Data
US 2022/0261335 A1    Aug. 18, 2022

(51) Int. Cl.
G06F 11/00    (2006.01)
G06F 11/36    (2006.01)
H04W 12/06    (2021.01)

(52) U.S. Cl.
CPC ...... *G06F 11/3664* (2013.01); *G06F 11/3656* (2013.01); *H04W 12/06* (2013.01)

(58) Field of Classification Search
CPC .......... G06F 11/3656; G06F 11/3664
See application file for complete search history.

(56) References Cited

U.S. PATENT DOCUMENTS 8,837,408 B2    9/2014  Sun
8,839,408 B1    9/2014  McKinnon et al.
(Continued)

FOREIGN PATENT DOCUMENTS

CN    102510408 B    1/2015
CN    104967585 B    7/2018
(Continued)

OTHER PUBLICATIONS

Chen, Lu. (Sep. 14, 2014). Translation of CN108536479, Method and device for restarting Android device, Espacenet. https://worldwide.espacenet.com/patent/search/family/063480759/publication/CN108536479A?q=CN108536479.*

(Continued)

*Primary Examiner* — Joshua P Lottich
(74) *Attorney, Agent, or Firm* — Sheridan Ross P.C.

(57) ABSTRACT

In some examples, device debugging connection control and maintenance may include receiving, from a debug tool, a connection request to connect to a device to be debugged. Based on the connection request, a primary socket connection may be implemented via a Universal Serial Bus (USB) channel to the device. Based on the connection request, a backup socket connection may be implemented via a Wi-Fi channel to the device. Based on the implementation of the primary socket connection and the backup socket connection, maintenance of a debugging session may be controlled during performance of a debugging operation.

20 Claims, 5 Drawing Sheets

(56) References Cited

U.S. PATENT DOCUMENTS

| | | | | |
|---|---|---|---|---|
| 10,049,029 | B1* | 8/2018 | Vu | G06F 11/3656 |
| 10,223,241 | B2 | 3/2019 | Chen | |
| 2007/0055858 | A1 | 3/2007 | Takahashi | |
| 2017/0115350 | A1* | 4/2017 | Zhang | G01R 31/31705 |
| 2017/0262130 | A1* | 9/2017 | Lloyd | G06F 11/3664 |
| 2017/0286254 | A1* | 10/2017 | Menon | G06F 11/3636 |
| 2019/0137567 | A1* | 5/2019 | Lambert | G06F 11/07 |
| 2019/0138369 | A1* | 5/2019 | Lambert | H04L 41/0645 |
| 2019/0220386 | A1* | 7/2019 | Schneider | G06F 9/30134 |
| 2019/0227917 | A1* | 7/2019 | Henry | G06F 11/3688 |

FOREIGN PATENT DOCUMENTS

| | | |
|---|---|---|
| CN | 108536479 A | 9/2018 |
| CN | 107463499 B | 10/2020 |
| WO | WO-2018209802 A1 | 11/2018 |

OTHER PUBLICATIONS

Author Unknown; Android Debug Bridge (adb); 27 pages.
GURU99; Connect Mobile using Android Debug Bridge(ADB) over USB & WIFI; https://www.guru99.com; 2019; 10 pages.
International Search Authority; Written Opinion/Search Results; PCT/CN2019/095398; dated Apr. 9, 2020; 9 Pages.
MICROFOCUS; Mobil Center Help; https://admhelp.microfocus.com/mobilecenter/en/3.1/Content/Resources/_TopNav/_TopNav_Home.htm; 2 pages; Apr. 2019.
MICROSOFT; Set Up Device for Development;Set Up Device for Development—Xamarin I Microsoft Docs; Jun. 22, 2018; 10 Pages.
Sumesh Murali; How does High Availability/Fast Failover Feature Work and How to Configure ?; Jul. 1, 2014; 6 pages.
Tushar Takodra; How to Debug Android app over Wifi; Simbeez; http://simbeez.com; Oct. 9, 2017; 7 pages.

* cited by examiner

```
                           400
┌─────────────────────────────────────────────────────────────┐
│ RECEIVE, FROM A DEBUG TOOL, A CONNECTION REQUEST TO CONNECT │
│                 TO A DEVICE TO BE DEBUGGED                  │
│                             402                             │
└─────────────────────────────────────────────────────────────┘
                              ▼
┌─────────────────────────────────────────────────────────────┐
│  IMPLEMENT, BASED ON THE CONNECTION REQUEST, A PRIMARY      │
│  SOCKET CONNECTION VIA A UNIVERSAL SERIAL BUS (USB) CHANNEL │
│                        TO THE DEVICE                        │
│                             404                             │
└─────────────────────────────────────────────────────────────┘
                              ▼
┌─────────────────────────────────────────────────────────────┐
│     IMPLEMENT, BASED ON THE CONNECTION REQUEST, A BACKUP    │
│      SOCKET CONNECTION VIA A WI-FI CHANNEL TO THE DEVICE    │
│                             406                             │
└─────────────────────────────────────────────────────────────┘
                              ▼
┌─────────────────────────────────────────────────────────────┐
│        CONTROL, BASED ON THE IMPLEMENTATION OF THE PRIMARY  │
│     SOCKET CONNECTION AND THE BACKUP SOCKET CONNECTION,     │
│  MAINTENANCE OF A DEBUGGING SESSION DURING PERFORMANCE      │
│                  OF A DEBUGGING OPERATION                   │
│                             408                             │
└─────────────────────────────────────────────────────────────┘
                              ▼
┌─────────────────────────────────────────────────────────────┐
│    DETERMINE WHETHER THE PRIMARY SOCKET CONNECTION IS       │
│                          OPERATIONAL                        │
│                             410                             │
└─────────────────────────────────────────────────────────────┘
                              ▼
┌─────────────────────────────────────────────────────────────┐
│       BASED ON A DETERMINATION THAT THE PRIMARY SOCKET      │
│  CONNECTION IS OPERATIONAL, FORWARD, VIA THE PRIMARY SOCKET │
│     CONNECTION, A DEBUG COMMAND TO A DEVICE HIGH AVAILABILITY│
│                 CONNECTION CONTROL MODULE                   │
│                             412                             │
└─────────────────────────────────────────────────────────────┘
                              ▼
┌─────────────────────────────────────────────────────────────┐
│      BASED ON A DETERMINATION THAT THE PRIMARY SOCKET       │
│   CONNECTION IS NOT OPERATIONAL, FORWARD, VIA THE BACKUP    │
│  SOCKET CONNECTION, THE DEBUG COMMAND TO THE DEVICE HIGH    │
│        AVAILABILITY CONNECTION CONTROL MODULE               │
│                             414                             │
└─────────────────────────────────────────────────────────────┘
```

FIG. 4

DEVICE DEBUGGING CONNECTION CONTROL AND MAINTENANCE

BACKGROUND

A device, such as a mobile telephone, a tablet, etc., may be tested for a variety of purposes. For example, a device may be tested to analyze operation of sensors, components such as cameras, etc. An example of a technique that may be used to test a device may include a debugging operation that may be implemented to identify any faults or anomalies generally in the operation of the device.

BRIEF DESCRIPTION OF DRAWINGS

Features of the present disclosure are illustrated by way of example and not limited in the following figure(s), in which like numerals indicate like elements, in which:

FIG. 4 illustrates a flowchart of an example method for device debugging connection control and maintenance in accordance with an embodiment of the present disclosure.

DETAILED DESCRIPTION

Figure 1:
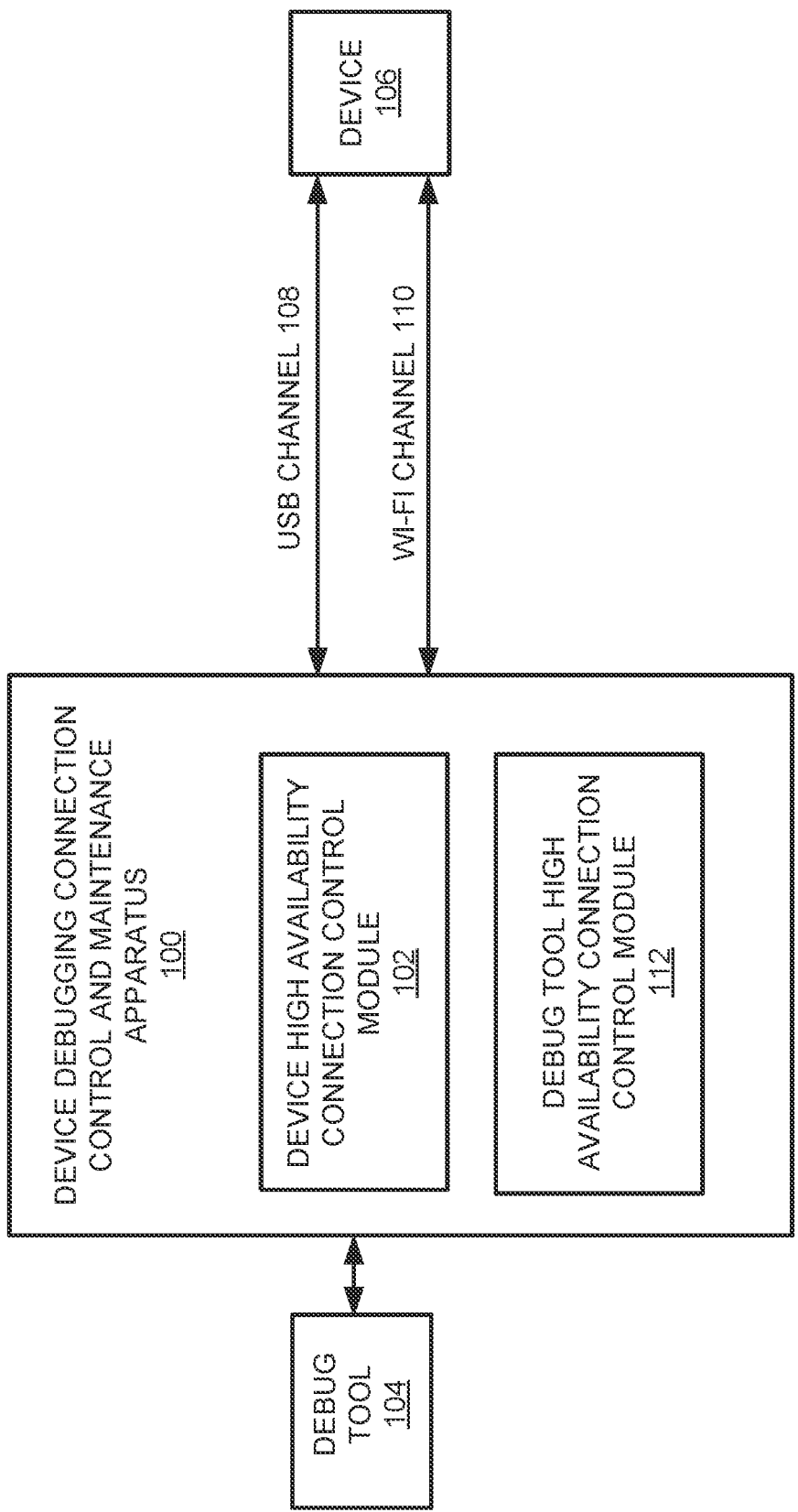
FIG. 1 illustrates a layout of a device debugging connection control and maintenance apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Device debugging connection control and maintenance apparatuses, methods for device debugging connection control and maintenance, and non-transitory computer readable media having stored thereon machine readable instructions to provide device debugging connection control and maintenance are disclosed herein. The apparatuses, methods, and non-transitory computer readable media disclosed herein provide for implementation of stability of a connection to devices that are subject to a debugging operation. For example, the apparatuses, methods, and non-transitory computer readable media disclosed herein provide for implementation of stability to devices managed by a device lab, for example, for debugging purposes. In this regard, the apparatuses, methods, and non-transitory computer readable media disclosed herein may implement two (or greater than two) socket connections between a debug tool and a device that is to be debugged. When a disconnection of one of the socket connections occurs, the other socket connection may replace the disconnected connection, such that a debugging session continues to run without any interruption. Disconnection in this regard may represent a physical disconnection, the occurrence of a timeout prior to performance of a command, or any other occurrence that would indicate the need to switch to another socket connection such that a debugging session continues to run without any interruption.

With respect to testing of a device, for example, for debugging purposes, a device may be connected to a debug tool, for example, to test an application, such as a mapping application, a website browser, a banking application, sensors, components such as cameras, etc. The device may include a debug daemon process that is executed on the device. The debug daemon process may listen on a socket server (e.g., Transmission Control Protocol (TCP), UNIX, etc.), and transfer an external debug request to debug core services. In some cases, the debug daemon may accept a single debug connection from a debug tool.

The debug tool may be executed, for example, on a personal computer (PC) side. The debug tool may implement features such as installation of an application on the device, fetching of device hardware and/or software information, monitoring of device logs, etc. Some types of debug commands may operate as a single request and a response. Other types of debug commands may need a connection to a device to be maintained until closing of the connection.

A debug daemon process on a device may operate as a socket server, which may listen to a socket connection request on a debug channel. The debug daemon process may be accessible from either a Universal Serial Bus (USB) or a TCP network (with a Wi-Fi address of the device). In this regard, with respect to USB debugging, a USB debug driver may be implemented on the PC side to convert USB to socket.

When a debug tool attempts to start a debug connection, an authentication process may be initiated to pair the device and the debugging PC for initialization of a debug channel. A user may need to confirm the authentication request to trust the device and/or the PC, for example, by clicking a checkbox of a dialogue pop up on a device screen. Such an authentication process may be performed via a USB connection, for example, due to security restrictions. Thereafter, a public key generated by the debug tool, which may be implemented on the PC, may be stored on the device. Once the authentication is complete, the PC may create a debug connection with the device without the need for further authentication.

During a debugging operation, a connection between the debug tool and the device may need to be maintained for completion of a debugging session. In this regard, it is technically challenging to maintain the connection between the debug tool and the device such that a debugging session continues to run without any interruption, as the connection may be lost (e.g., a disconnection has occurred) for a variety of reasons. Further, if the connection between the debug tool and the device is lost, it is technically challenging to complete the debugging session without having to restart the debugging session.

In order address at least the aforementioned technical challenges, the apparatuses, methods, and non-transitory computer readable media disclosed herein may implement a debug tool high availability connection control module and a device high availability connection control module to control maintenance of a debugging session during performance of a debugging operation. In this regard, according to examples disclosed herein, the debug tool high availability connection control module may be implemented on a PC side, and the device high availability connection control module may be implemented on a device side. For example, when a debug tool from a PC attempts to set up a debug connection with a USB connected device, the debug tool high availability connection control module may create two socket connections. One socket connection may be through USB (e.g., a USB channel), and the other socket connection may be through Wi-Fi (e.g., a Wi-Fi channel). According to examples disclosed herein, the socket connection through USB may represent a primary socket connection, and the socket connection through Wi-Fi may represent a backup socket connection. These designations may be reversed depending on a particular debugging set up. When a disconnection occurs at the USB channel, the device high availability connection control module, which may operate in conjunction with the debug tool high availability connection control module, may switch to the Wi-Fi channel. The debug tool high availability connection control module and the device high availability connection control module may activate the Wi-Fi channel without breaking the logical debug session between the debug tool and the debug daemon on the device.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example device debugging connection control and maintenance apparatus (hereinafter also referred to as "apparatus 100").

Referring to FIG. 1, the apparatus 100 may include a device high availability connection control module 102 to receive, from a debug tool 104, a connection request to connect to a device 106 to be debugged. The device high availability connection control module 102 may be executed on the device 106. The device high availability connection control module 102 may implement, based on the connection request, a primary socket connection via a Universal Serial Bus (USB) channel 108 to the device 106, and access device debugging services. The device high availability connection control module 102 may further implement, based on the connection request, a backup socket connection via a Wi-Fi channel 110 to the device 106. The device high availability connection control module 102 may control, based on the implementation of the primary socket connection and the backup socket connection, maintenance of a debugging session during performance of a debugging operation.

According to examples disclosed herein, the device high availability connection control module 102 may receive, from the debug tool 104, the connection request to connect to the device 106 to be debugged by receiving, from the debug tool 104, the connection request that includes an authentication request to connect to the device 106 to be debugged. In this regard, the device high availability connection control module 102 may determine whether the authentication request is valid. Based on a determination that the authentication request is valid, the device high availability connection control module 102 may determine a Wi-Fi address of the device 106. Further, the device high availability connection control module 102 may forward, via the USB channel 108, the Wi-Fi address of the device 106 to a debug tool high availability connection control module 112 associated with the debug tool 104.

According to examples disclosed herein, the device high availability connection control module 102 may implement, based on the connection request, the backup socket connection via the Wi-Fi channel 110 to the device 106 by implementing, based on the connection request, the backup socket connection via the Wi-Fi channel 110 using the Wi-Fi address of the device 106.

According to examples disclosed herein, the device high availability connection control module 102 may control, based on the implementation of the primary socket connection and the backup socket connection, maintenance of the debugging session during performance of the debugging operation by determining whether a disconnection of the primary socket connection has occurred. Based on a determination that the disconnection of the primary socket connection has occurred, the device high availability connection control module 102 may receive, via the backup socket connection, debug commands to maintain the debugging session.

According to examples disclosed herein, the device high availability connection control module 102 may determine, after the disconnection of the primary socket connection, whether a reconnection of the primary socket connection has occurred. Based on a determination that the reconnection of the primary socket connection has occurred, the device high availability connection control module 102 may switch from the backup socket connection to the primary socket connection to maintain the debugging session.

According to examples disclosed herein, the device high availability connection control module 102 may control, based on the implementation of the primary socket connection and the backup socket connection, maintenance of the debugging session during performance of the debugging operation by determining whether a disconnection of the primary socket connection has occurred. Based on a determination that the disconnection of the primary socket connection has occurred, the device high availability connection control module 102 may receive, via the backup socket connection, last failed debug tool socket packets to maintain the debugging session.

According to examples disclosed herein, the device high availability connection control module 102 may receive, from the debug tool 104, the connection request to connect to the device 106 to be debugged by receiving, from the debug tool high availability connection control module 112 operatively connected to the debug tool 104, the connection request to connect to the device to be debugged.

With respect to the debug tool high availability connection control module 112, the debug tool high availability connection control module 112 may receive, from the debug tool 104, a connection request to connect to the device 106 to be debugged. The debug tool high availability connection control module 112 may implement, based on the connection request, the primary socket connection via the USB channel 108 to the device 106 (in this regard, the debug tool high availability connection control module 112 may operate in conjunction with the device high availability connection control module 102). The debug tool high availability connection control module 112 may implement, based on the connection request, the backup socket connection via the Wi-Fi channel 110 to the device 106 (in this regard, the debug tool high availability connection control module 112 may operate in conjunction with the device high availability connection control module 102). The debug tool high availability connection control module 112 may control, based on the implementation of the primary socket connection and the backup socket connection, maintenance of a debugging session during performance of a debugging operation by determining whether the primary socket connection is operational. Based on a determination that the primary socket connection is operational, the debug tool high availability connection control module 112 may forward, via the primary socket connection, a debug command to the device high availability connection control module 102. Further, based on a determination that the primary socket connection is not operational, the debug tool high availability connection control module 112 may forward, via the backup socket connection, the debug command to the device high availability connection control module 102.

According to examples disclosed herein, the debug tool high availability connection control module 112 may control, based on the implementation of the primary socket connection and the backup socket connection, maintenance of the debugging session during performance of the debugging operation by determining whether a disconnection of the primary socket connection has occurred. Based on a determination that the disconnection of the primary socket connection has occurred, the debug tool high availability connection control module 112 may forward, via the backup socket connection, debug commands to maintain the debugging session.

According to examples disclosed herein, the debug tool high availability connection control module 112 may control, based on the implementation of the primary socket connection and the backup socket connection, maintenance of the debugging session during performance of the debugging by determining, after the disconnection of the primary socket connection, whether a reconnection of the primary socket connection has occurred. Based on a determination that the reconnection of the primary socket connection has occurred, the debug tool high availability connection control module 112 may switch from the backup socket connection to the primary socket connection to maintain the debugging session.

According to examples disclosed herein, the debug tool high availability connection control module 112 may control, based on the implementation of the primary socket connection and the backup socket connection, maintenance of the debugging session during performance of the debugging operation by determining whether a disconnection of the primary socket connection has occurred. Based on a determination that the disconnection of the primary socket connection has occurred, the debug tool high availability connection control module 112 may forward, via the backup socket connection, last failed debug tool socket packets to maintain the debugging session.

Operation of the apparatus 100 is described in further detail with reference to FIGS. 1 and 2.

Figure 2:
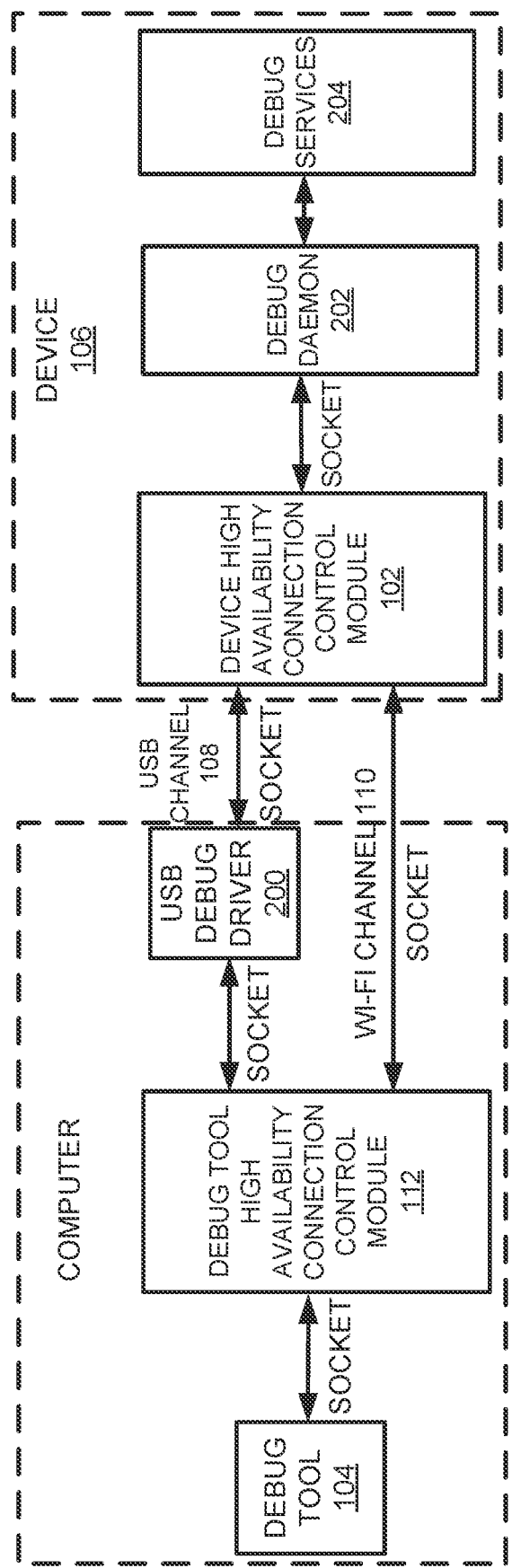
FIG. 2 illustrates further details of the layout of the device debugging connection control and maintenance apparatus of FIG. 1 in accordance with an embodiment of the present disclosure.

Referring to FIGS. 1 and 2, and particularly FIG. 2, the debug tool high availability connection control module 112 may monitor and intercept messages from the debug tool 104 (e.g., from a debug tool server associated with the debug tool 104).

With respect to initial pairing and authentication, as disclosed herein, the device high availability connection control module 102 may receive, from the debug tool 104, the connection request to connect to the device 106 to be debugged by receiving, from the debug tool 104 (e.g., via the debug tool high availability connection control module 112), the connection request that includes an authentication request to connect to the device 106 to be debugged. In this regard, the debug tool high availability connection control module 112 may forward an authentication request message from the debug tool 104 to the device high availability connection control module 102 via the USB channel 108 (e.g., from a USB debug driver 200). The device high availability connection control module 102 may start a socket connection to a debug daemon 202 on the device 106, and send the authentication request to the debug daemon 202, which may operate in conjunction with debug services 204 to validate the authentication request. Once the daemon process receives the authentication request from the device high availability connection control module 102, the daemon process may trigger a pop up that requests a user to trust a PC that executes the debug tool 104. Once the authentication request is validated, the daemon process, as performed by the debut daemon 202, may send a response to the device high availability connection control module 102, the device high availability connection control module 102 may add a Wi-Fi address of the device 106 to a message header, and the device high availability connection control module 102 may send a response including the message header back to the debug tool high availability connection control module 112 via the USB channel 108. In this regard, during the authentication process, the debug tool 104 and the debug daemon 202 may effectively communicate with each other via the USB channel 108, and via the debug tool high availability connection control module 112 and the device high availability connection control module 102. Once the debug tool high availability connection control module 112 receives a successful authentication response, an identification of the device 106 may be stored for future communication and debugging.

As disclosed herein, the device high availability connection control module 102 (and the debug tool high availability connection control module 112) may further implement, based on the connection request, a backup socket connection via the Wi-Fi channel 110 to the device 106. Further, the device high availability connection control module 102 may forward, via the USB channel 108, the Wi-Fi address of the device 106 to the debug tool high availability connection control module 112. In this regard, the debug tool high availability connection control module 112 may extract the Wi-Fi address of the device 106 from the authentication response, and start a socket connection to the device high availability connection control module 102 via the Wi-Fi channel 110. The device high availability connection control module 102 may maintain the socket connection with the debug daemon 202. However, the device high availability connection control module 102 may not send a notification of a Wi-Fi connection to the debug daemon 202. This is because the debug daemon process on the device 106 may allow, for example, one socket connection at a time.

The debug tool high availability connection control module 112 may receive a message, such as an "install application" message, from the debug tool 104. The debug tool high availability connection control module 112 may analyze operability of the socket connection to the debug tool high availability connection control module 112 via the USB channel 108. If the connection between the debug tool high availability connection control module 112 and the device high availability connection control module 102 via the USB channel 108 is lost (e.g., disconnected), the debug tool high availability connection control module 112 may switch to use the Wi-Fi channel 110 to send the message to the device high availability connection control module 102.

When a socket disconnection occurs with respect to the USB channel 108, both the debug tool high availability connection control module 112 and the device high availability connection control module 102 may receive a notification of the disconnection event. If the Wi-Fi channel 110 is available, the debug tool high availability connection control module 112 may resend the last failed debug tool socket packets to the device high availability connection control module 102 via the Wi-Fi channel 110. Further, the device high availability connection control module 102 may continue to forward associated debug commands to the debug daemon 202 to maintain the debug session.

For example, with respect to an "install application" command, during execution of this command, a debug server on a PC that includes the debug tool 104 may push an application file in a socket packet format to the debug daemon 202 via the debug tool high availability connection control module 112. If a disconnection occurs with respect to the USB channel 108, the debug tool high availability connection control module 112 and the device high availability connection control module 102 may switch to the Wi-Fi channel 110 to maintain continuous transfer of the application file.

When the debug tool high availability connection control module 112 operates in the backup Wi-Fi channel mode, the debug tool high availability connection control module 112 may continue to send commands to the device high availability connection control module 102 via the USB debug driver 200 to retrieve connected devices. If the USB channel 108 becomes available again, the debug tool high availability connection control module 112 may switch from the Wi-Fi channel 110 to the USB channel 108.

Figure 3:
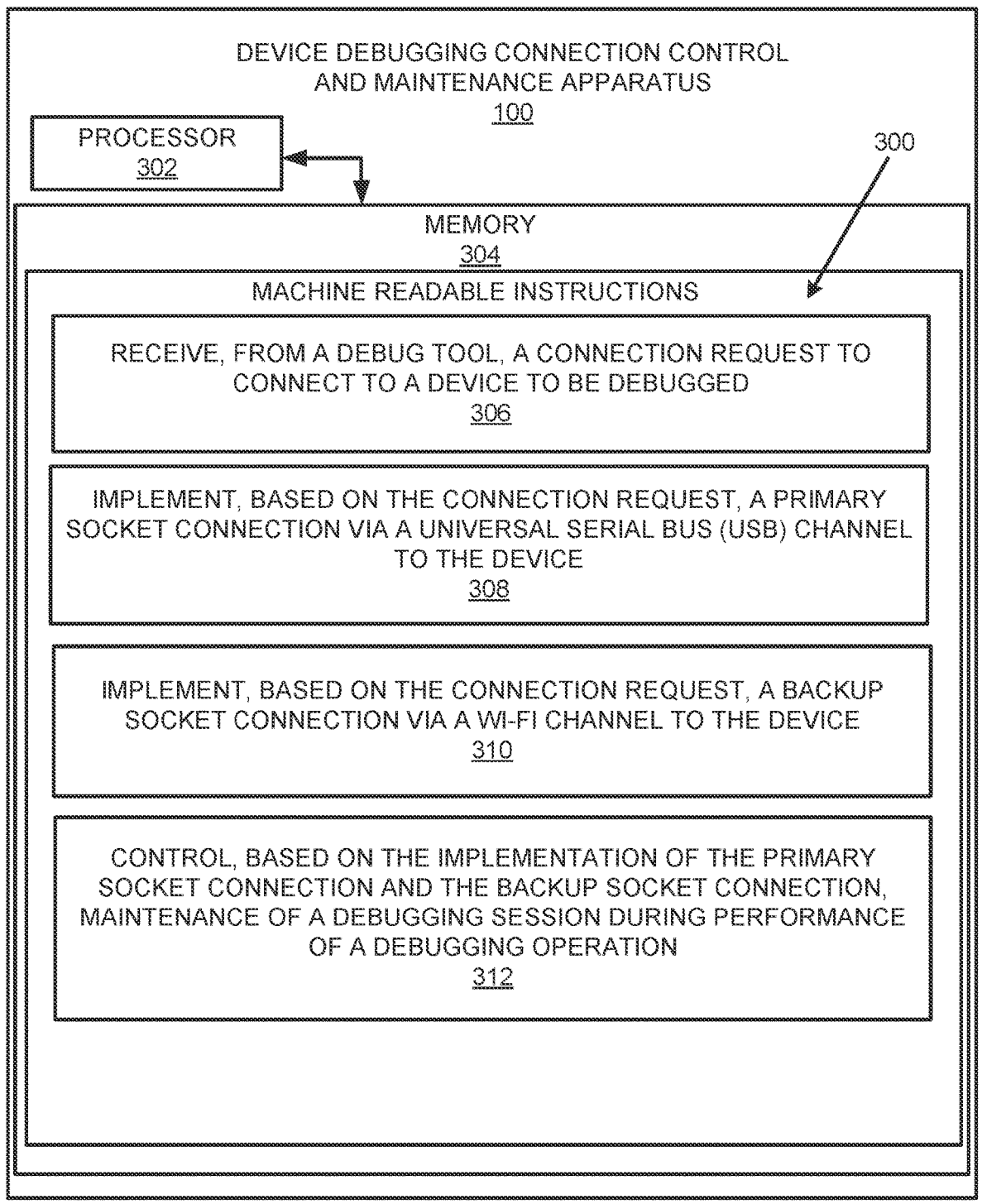
FIG. 3 illustrates an example block diagram for device debugging connection control and maintenance in accordance with an embodiment of the present disclosure.
Figure 5:
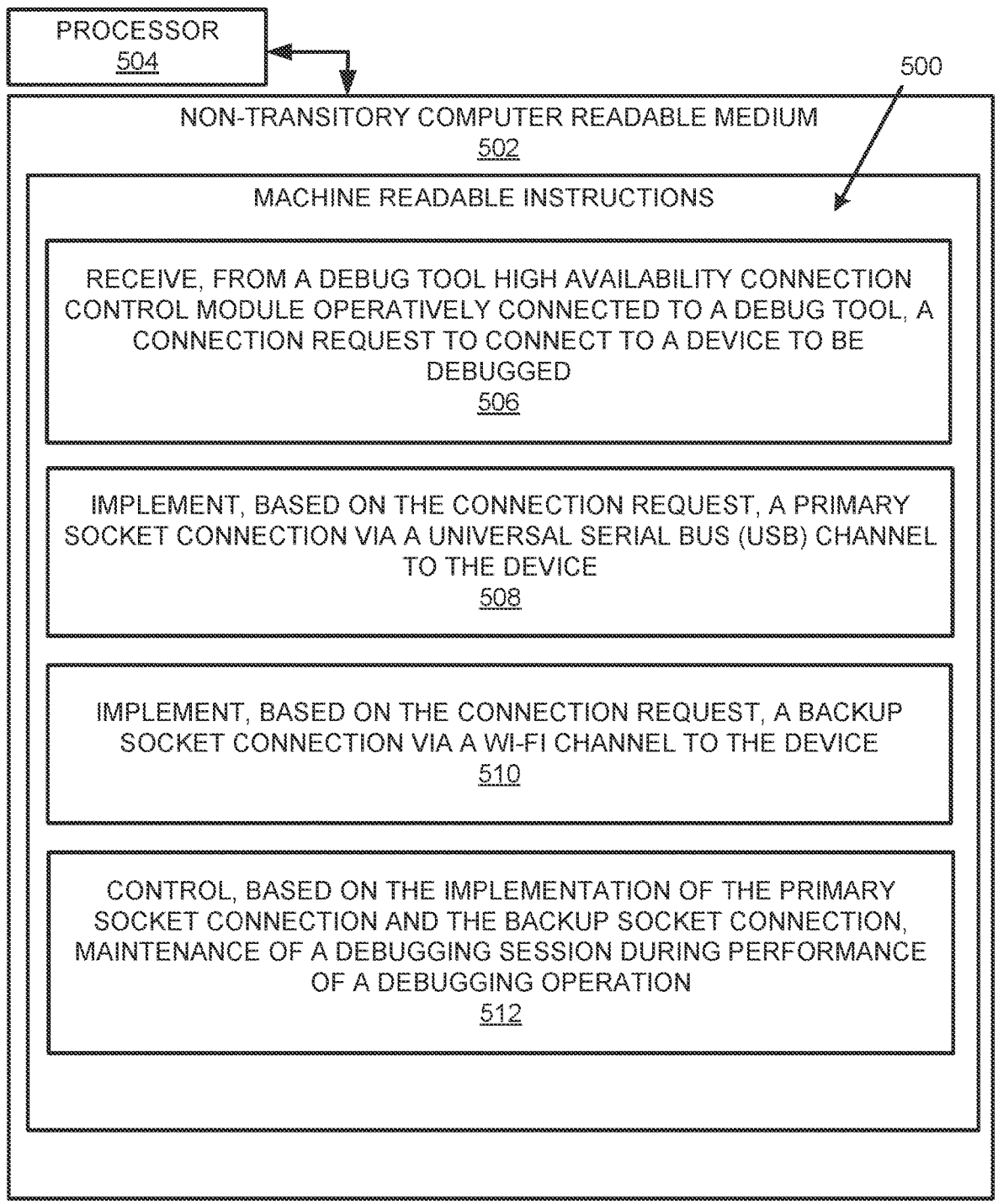
FIG. 5 illustrates a further example block diagram for device debugging connection control and maintenance in accordance with another embodiment of the present disclosure.

FIGS. 3-5 respectively illustrate an example block diagram 300, a flowchart of an example method 400, and a further example block diagram 500 for device debugging connection control and maintenance, according to examples. The block diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for device debugging connection control and maintenance, and the steps of the method. FIG. 5 may represent a non-transitory computer readable medium 502 having stored thereon machine readable instructions to provide device debugging connection control and maintenance according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to receive, from a debug tool 104, a connection request to connect to a device 106 to be debugged.

The processor 302 may fetch, decode, and execute the instructions 308 to implement, based on the connection request, a primary socket connection via a Universal Serial Bus (USB) channel 108 to the device 106.

The processor 302 may fetch, decode, and execute the instructions 310 to implement, based on the connection request, a backup socket connection via a Wi-Fi channel 110 to the device 106.

The processor 302 may fetch, decode, and execute the instructions 312 to control, based on the implementation of the primary socket connection and the backup socket connection, maintenance of a debugging session during performance of a debugging operation.

Referring to FIGS. 1-2 and 4, and particularly FIG. 4, for the method 400, at block 402, the method may include receiving, from a debug tool 104, a connection request to connect to a device 106 to be debugged.

At block 404, the method may include implementing, based on the connection request, a primary socket connection via a USB channel 108 to the device 106.

At block 406, the method may include implementing, based on the connection request, a backup socket connection via a Wi-Fi channel 110 to the device 106.

At block 408, the method may include controlling, based on the implementation of the primary socket connection and the backup socket connection, maintenance of a debugging session during performance of a debugging operation.

At block 410, the method may include determining whether the primary socket connection is operational.

Based on a determination that the primary socket connection is operational, at block 412, the method may include forwarding, via the primary socket connection, a debug command to a device high availability connection control module.

Based on a determination that the primary socket connection is not operational, at block 414, the method may include forwarding, via the backup socket connection, the debug command to the device high availability connection control module.

Referring to FIGS. 1-2 and 5, and particularly FIG. 5, for the block diagram 500, the non-transitory computer readable medium 502 may include instructions 506 to receive, from a debug tool high availability connection control module 112 operatively connected to a debug tool 104, a connection request to connect to a device 106 to be debugged.

The processor 504 may fetch, decode, and execute the instructions 508 to implement, based on the connection request, a primary socket connection via a USB channel 108 to the device 106.

The processor 504 may fetch, decode, and execute the instructions 510 to implement, based on the connection request, a backup socket connection via a Wi-Fi channel 110 to the device 106.

The processor 504 may fetch, decode, and execute the instructions 512 to control, based on the implementation of the primary socket connection and the backup socket connection, maintenance of a debugging session during performance of a debugging operation.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus, comprising:
    a processor; and
    a memory storing machine readable instructions that when executed by the processor cause the processor to:
        receive, from a debug tool, a connection request to connect to a device to be debugged;
        implement, based on the connection request, a primary socket connection via a Universal Serial Bus (USB) channel to the device;
        implement, based on the connection request, a backup socket connection via a Wi-Fi channel to the device;
        control, based on the implementation of the primary socket connection and the backup socket connection, maintenance of a debugging session during performance of a debugging operation; and
        when a disconnection of one of the primary socket or the backup socket occurs, replace the other of the primary socket or the backup socket such that the debugging session continues to operate without interruption.

2. The apparatus according to claim 1, wherein the instructions to receive, from the debug tool, the connection request to connect to the device to be debugged are further to cause the processor to:
    receive, from the debug tool, the connection request that includes an authentication request to connect to the device to be debugged;
    determine whether the authentication request is valid;
    based on a determination that the authentication request is valid, determine a Wi-Fi address of the device; and
    forward, via the USB channel, the Wi-Fi address of the device to a debug tool high availability connection control module associated with the debug tool.

3. The apparatus according to claim 2, wherein the instructions to implement, based on the connection request, the backup socket connection via the Wi-Fi channel to the device are further to cause the processor to:
    implement, based on the connection request, the backup socket connection via the Wi-Fi channel using the Wi-Fi address of the device.

4. The apparatus according to claim 1, wherein the instructions to control, based on the implementation of the primary socket connection and the backup socket connection, maintenance of the debugging session during performance of the debugging operation are further to cause the processor to:
    determine whether a disconnection of the primary socket connection has occurred; and
    based on a determination that the disconnection of the primary socket connection has occurred, receive, via the backup socket connection, debug commands to maintain the debugging session.

5. The apparatus according to claim 4, wherein the instructions to control, based on the implementation of the primary socket connection and the backup socket connection, maintenance of the debugging session during performance of the debugging operation are further to cause the processor to:
    determine, after the disconnection of the primary socket connection, whether a reconnection of the primary socket connection has occurred; and
    based on a determination that the reconnection of the primary socket connection has occurred, switch from the backup socket connection to the primary socket connection to maintain the debugging session.

6. The apparatus according to claim 1, wherein the instructions to control, based on the implementation of the primary socket connection and the backup socket connection, maintenance of the debugging session during performance of the debugging operation are further to cause the processor to:
    determine whether a disconnection of the primary socket connection has occurred; and
    based on a determination that the disconnection of the primary socket connection has occurred, receive, via the backup socket connection, last failed debug tool socket packets to maintain the debugging session.

7. The apparatus according to claim 1, wherein the instructions to receive, from the debug tool, the connection request to connect to the device to be debugged are further to cause the processor to:
    receive, from a debug tool high availability connection control module operatively connected to the debug tool, the connection request to connect to the device to be debugged.

8. A computer-implemented method comprising:
    receiving, from a debug tool, a connection request to connect to a device to be debugged;
    implementing, based on the connection request, a primary socket connection via a Universal Serial Bus (USB) channel to the device;
    implementing, based on the connection request, a backup socket connection via a Wi-Fi channel to the device; and
    controlling, based on the implementation of the primary socket connection and the backup socket connection, maintenance of a debugging session during performance of a debugging operation by:
        determining whether the primary socket connection is operational,
        based on a determination that the primary socket connection is operational, forwarding, via the primary socket connection, a debug command to a device high availability connection control module, and
        based on a determination that the primary socket connection is not operational, forwarding, via the backup socket connection, the debug command to the device high availability connection control module.

9. The computer-implemented method according to claim 8, wherein controlling, based on the implementation of the primary socket connection and the backup socket connection, maintenance of the debugging session during performance of the debugging operation further comprises:
  determining whether a disconnection of the primary socket connection has occurred; and
  based on a determination that the disconnection of the primary socket connection has occurred, forwarding, via the backup socket connection, debug commands to maintain the debugging session.

10. The computer-implemented method according to claim 9, wherein controlling, based on the implementation of the primary socket connection and the backup socket connection, maintenance of the debugging session during performance of the debugging operation further comprises:
  determining, after the disconnection of the primary socket connection, whether a reconnection of the primary socket connection has occurred; and
  based on a determination that the reconnection of the primary socket connection has occurred, switching from the backup socket connection to the primary socket connection to maintain the debugging session.

11. The computer-implemented method according to claim 8, wherein controlling, based on the implementation of the primary socket connection and the backup socket connection, maintenance of the debugging session during performance of the debugging operation further comprises:
  determining whether a disconnection of the primary socket connection has occurred; and
  based on a determination that the disconnection of the primary socket connection has occurred, forwarding, via the backup socket connection, last failed debug tool socket packets to maintain the debugging session.

12. The computer-implemented method according to claim 8, wherein receiving, from the debug tool, the connection request to connect to the device to be debugged further comprises:
  receiving, from the debug tool, the connection request that includes an authentication request to connect to the device to be debugged;
  determining whether the authentication request is valid;
  based on a determination that the authentication request is valid, determining a Wi-Fi address of the device; and
  forwarding, via the USB channel, the Wi-Fi address of the device to a debug tool high availability connection control module associated with the debug tool.

13. The computer-implemented method according to claim 12, wherein implementing, based on the connection request, the backup socket connection via the Wi-Fi channel to the device further comprises:
  implementing, based on the connection request, the backup socket connection via the Wi-Fi channel using the Wi-Fi address of the device.

14. A non-transitory computer readable medium having stored thereon machine readable instructions, the machine readable instructions, when executed by a processor, cause the processor to:
  receive, from a debug tool high availability connection control module operatively connected to a debug tool, a connection request to connect to a device to be debugged;
  implement, based on the connection request, a primary socket connection via a Universal Serial Bus (USB) channel to the device;
  implement, based on the connection request, a backup socket connection via a Wi-Fi channel to the device; and
  control, based on the implementation of the primary socket connection and the backup socket connection, maintenance of a debugging session during performance of a debugging operation;
  when a disconnection of one of the primary socket or the backup socket occurs, replace the other of the primary socket or the backup socket such that the debugging session continues to operate without interruption.

15. The non-transitory computer readable medium according to claim 14, wherein the instructions to receive, from the debug tool high availability connection control module operatively connected to the debug tool, the connection request to connect to the device to be debugged are further to cause the processor to:
  receive, from the debug tool high availability connection control module operatively connected to the debug tool, the connection request that includes an authentication request to connect to the device to be debugged;
  determine whether the authentication request is valid;
  based on a determination that the authentication request is valid, determine a Wi-Fi address of the device; and
  forward, via the USB channel, the Wi-Fi address of the device to the debug tool high availability connection control module operatively connected to the debug tool.

16. The non-transitory computer readable medium according to claim 15, wherein the instructions to implement, based on the connection request, the backup socket connection via the Wi-Fi channel to the device are further to cause the processor to:
  implement, based on the connection request, the backup socket connection via the Wi-Fi channel using the Wi-Fi address of the device.

17. The non-transitory computer readable medium according to claim 14, wherein the instructions to control, based on the implementation of the primary socket connection and the backup socket connection, maintenance of the debugging session during performance of the debugging operation are further to cause the processor to:
  determine whether a disconnection of the primary socket connection has occurred; and
  based on a determination that the disconnection of the primary socket connection has occurred, receive, via the backup socket connection, debug commands to maintain the debugging session.

18. The non-transitory computer readable medium according to claim 17, wherein the instructions to control, based on the implementation of the primary socket connection and the backup socket connection, maintenance of the debugging session during performance of the debugging operation are further to cause the processor to:
  determine, after the disconnection of the primary socket connection, whether a reconnection of the primary socket connection has occurred; and
  based on a determination that the reconnection of the primary socket connection has occurred, switch from the backup socket connection to the primary socket connection to maintain the debugging session.

19. The non-transitory computer readable medium according to claim 14, wherein the instructions to control, based on the implementation of the primary socket connection and the backup socket connection, maintenance of the debugging session during performance of the debugging operation are further to cause the processor to:

determine whether a disconnection of the primary socket connection has occurred; and based on a determination that the disconnection of the primary socket connection has occurred, receive, via the backup socket connection, last failed debug tool socket packets to maintain the debugging session.

20. The non-transitory computer readable medium according to claim 14, wherein the instructions to receive, from the debug tool high availability connection control module operatively connected to the debug tool, the connection request to connect to the device to be debugged are further to cause the processor to:

receive, from the debug tool high availability connection control module operatively connected to the debug tool, the connection request to connect to the device to be debugged.

* * * * *